US010600073B2

(12) United States Patent
Avner

(10) Patent No.: US 10,600,073 B2
(45) Date of Patent: Mar. 24, 2020

(54) SYSTEM AND METHOD FOR TRACKING THE PERFORMANCE OF ADVERTISEMENTS AND PREDICTING FUTURE BEHAVIOR OF THE ADVERTISEMENT

(71) Applicant: INNOVID INC., New York, NY (US)

(72) Inventor: Amit Avner, Herzliya (IL)

(73) Assignee: INNOVID INC., New York, NY (US)

( * ) Notice: Subject to any disclaimer, the term of this patent is extended or adjusted under 35 U.S.C. 154(b) by 0 days.

(21) Appl. No.: 14/818,373

(22) Filed: Aug. 5, 2015

(65) Prior Publication Data

US 2015/0339699 A1 Nov. 26, 2015

Related U.S. Application Data

(63) Continuation-in-part of application No. 14/272,081, filed on May 7, 2014, now Pat. No. 9,165,054, which is a continuation of application No. 13/482,473, filed on May 29, 2012, now Pat. No. 8,782,046, which is a continuation-in-part of application No. 13/279,673, filed on Oct. 24, 2011, now Pat. No. 9,183,292, which is a continuation-in-part of application No. 13/050,515, filed on Mar. 17, 2011, now Pat. No. 8,930,377, and a continuation-in-part of application No. 13/214,588, filed on Aug. 22, 2011, now Pat. No. 8,965,835, which is a continuation-in-part of
(Continued)

(51) Int. Cl.
*G06F 16/30* (2019.01)
*G06Q 30/02* (2012.01)

(52) U.S. Cl.
CPC .............. *G06Q 30/0242* (2013.01)

(58) Field of Classification Search
CPC .. G06F 16/248; G06F 16/487; G06Q 30/0242
USPC .......... 707/607, 609, 687, 705, 790
See application file for complete search history.

(56) References Cited

U.S. PATENT DOCUMENTS

| 6,463,430 B1 | 10/2002 | Brady et al. |
| 6,523,021 B1 | 2/2003 | Monberg et al. |
(Continued)

FOREIGN PATENT DOCUMENTS

| JP | 2000305952 | 11/2000 |
| KR | 20090034052 | 4/2009 |
(Continued)

OTHER PUBLICATIONS

International Searching Authority, "International Search Report and Written Opinion" for the corresponding International Patent Application PCT/IL2011/028846; dated Sep. 28, 2011.

*Primary Examiner* — Sana A Al-Hashemi

(57) ABSTRACT

A method and system for tracking the performance of an advertisement are provided. The method includes receiving at least one advertisement and associated metadata from a client node; publishing the at least one advertisement through at least one advertisement channel; continuously collecting at least one variable in association with the at least one advertisement; continuously monitoring the performance of the at least one advertisement; and generating a prediction of future behavior of the at least one advertisement with respective to the at least one variable and the monitored performance of the at least one advertisement.

16 Claims, 2 Drawing Sheets

Related U.S. Application Data application No. 13/050,515, filed on Mar. 17, 2011, now Pat. No. 8,930,377.

(60) Provisional application No. 62/034,010, filed on Aug. 6, 2014, provisional application No. 61/316,844, filed on Mar. 24, 2010.

(56) References Cited

U.S. PATENT DOCUMENTS

| | | |
|---|---|---|
| 7,035,864 B1 | 4/2006 | Ferrari et al. |
| 7,062,483 B2 | 6/2006 | Ferrari et al. |
| 7,389,252 B2 | 6/2008 | Robb et al. |
| 7,409,404 B2 | 8/2008 | Gates |
| 7,426,499 B2 | 9/2008 | Eder |
| 7,428,554 B1 | 9/2008 | Coberley et al. |
| 7,433,876 B2 | 10/2008 | Spivack et al. |
| 7,543,232 B2 | 6/2009 | Easton, Jr. et al. |
| 7,567,957 B2 | 7/2009 | Ferrari et al. |
| 7,617,184 B2 | 11/2009 | Ferrari et al. |
| 7,620,628 B2 | 11/2009 | Kapur et al. |
| 7,865,354 B2 | 1/2011 | Chitrapura et al. |
| 7,890,382 B2 | 2/2011 | Robb et al. |
| 8,495,143 B2 | 7/2013 | Zhou et al. |
| 8,600,796 B1 | 12/2013 | Sterne et al. |
| 8,631,122 B2 | 1/2014 | Kadam et al. |
| 8,818,788 B1 | 8/2014 | Mihalik et al. |
| 8,886,836 B2 | 11/2014 | Luu |
| 9,934,510 B2 * | 4/2018 | Collins .............. G06Q 10/0631 |
| 2004/0003402 A1 | 1/2004 | McKenna |
| 2005/0091200 A1 | 4/2005 | Melton et al. |
| 2006/0010029 A1 | 1/2006 | Gross |
| 2006/0242017 A1 * | 10/2006 | Libes ................ G06F 17/30864 705/14.54 |
| 2007/0027761 A1 * | 2/2007 | Collins .................. G06Q 30/02 705/14.58 |
| 2007/0037864 A1 * | 2/2007 | Bauman ................ C07C 69/736 514/369 |
| 2007/0050389 A1 | 3/2007 | Kim et al. |
| 2007/0100779 A1 | 5/2007 | Levy et al. |
| 2007/0106627 A1 | 5/2007 | Srivastava et al. |
| 2007/0143296 A1 | 6/2007 | Casion |
| 2007/0192300 A1 | 8/2007 | Reuther et al. |
| 2007/0208728 A1 | 9/2007 | Zhang et al. |
| 2007/0276676 A1 | 11/2007 | Hoenig et al. |
| 2008/0027769 A1 | 1/2008 | Eder |
| 2008/0052630 A1 | 2/2008 | Rosenbaum et al. |
| 2008/0082463 A1 | 4/2008 | Cheng et al. |
| 2008/0109285 A1 | 5/2008 | Reuther et al. |
| 2008/0126411 A1 | 5/2008 | Zhuang et al. |
| 2008/0133488 A1 | 6/2008 | Bandaru et al. |
| 2008/0189269 A1 | 8/2008 | Olsen |
| 2008/0208820 A1 | 8/2008 | Usey et al. |
| 2008/0215607 A1 | 9/2008 | Kaushansky et al. |
| 2008/0243531 A1 | 10/2008 | Hyder et al. |
| 2008/0249764 A1 | 10/2008 | Huang et al. |
| 2008/0250065 A1 | 10/2008 | Barrs et al. |
| 2008/0263589 A1 | 10/2008 | Jacobson et al. |
| 2008/0281915 A1 | 11/2008 | Elad et al. |
| 2009/0006525 A1 | 1/2009 | Moore |
| 2009/0077069 A1 | 3/2009 | Polanyi et al. |
| 2009/0113468 A1 | 4/2009 | Steelberg et al. |
| 2009/0125374 A1 | 5/2009 | Deaton et al. |
| 2009/0164400 A1 | 6/2009 | Amer-Yahia et al. |
| 2009/0164897 A1 | 6/2009 | Amer-Yahia et al. |
| 2009/0193011 A1 | 7/2009 | Blair-Goldensohn et al. |
| 2009/0204479 A1 * | 8/2009 | Wolinsky .............. G06Q 30/02 705/14.57 |
| 2009/0216581 A1 | 8/2009 | Carrier et al. |
| 2009/0216757 A1 | 8/2009 | Sen et al. |
| 2009/0292584 A1 | 11/2009 | Dalal et al. |
| 2009/0299826 A1 | 12/2009 | Hyder et al. |
| 2010/0004974 A1 | 1/2010 | Libby et al. |
| 2010/0036718 A1 | 2/2010 | Rick et al. |
| 2010/0042403 A1 | 2/2010 | Chandrasekar et al. |
| 2010/0050118 A1 | 2/2010 | Chowdhury et al. |
| 2010/0070293 A1 | 3/2010 | Brown et al. |
| 2010/0100537 A1 | 4/2010 | Druzgalski et al. |
| 2010/0138291 A1 | 6/2010 | Silverman et al. |
| 2010/0138451 A1 | 6/2010 | Henkin et al. |
| 2010/0153931 A1 * | 6/2010 | Arimilli ............... G06F 8/4441 717/140 |
| 2010/0235219 A1 | 9/2010 | Merrick et al. |
| 2010/0262454 A1 | 10/2010 | Sommer et al. |
| 2011/0004483 A1 | 1/2011 | Ting et al. |
| 2011/0035400 A1 * | 2/2011 | Nishida .................. G06Q 30/02 707/769 |
| 2011/0099207 A1 | 4/2011 | Brown et al. |
| 2011/0112900 A1 | 5/2011 | Sanghavi |
| 2011/0137906 A1 | 6/2011 | Cai et al. |
| 2011/0161312 A1 | 6/2011 | Wallman |
| 2011/0213655 A1 * | 9/2011 | Henkin .................. G06Q 30/00 705/14.49 |
| 2011/0225026 A1 | 9/2011 | Ketchum |
| 2011/0225048 A1 | 9/2011 | Nair |
| 2011/0225293 A1 * | 9/2011 | Rathod .................. G06Q 10/00 709/224 |
| 2011/0238485 A1 | 9/2011 | Haumont et al. |
| 2011/0251887 A1 | 10/2011 | Paul et al. |
| 2012/0011158 A1 | 1/2012 | Avner et al. |
| 2012/0110071 A1 | 5/2012 | Zhou et al. |
| 2012/0136959 A1 | 5/2012 | Kadam et al. |
| 2012/0143965 A1 | 6/2012 | Parker et al. |
| 2012/0166367 A1 | 6/2012 | Murdock et al. |
| 2012/0221406 A1 | 8/2012 | Kruhoeffer et al. |
| 2012/0317198 A1 | 12/2012 | Patton et al. |
| 2013/0024465 A1 | 1/2013 | Schiff et al. |
| 2013/0080222 A1 | 3/2013 | Quinn |
| 2013/0103637 A1 | 4/2013 | Dror et al. |
| 2013/0190004 A1 | 7/2013 | Papakipos et al. |
| 2013/0332523 A1 | 12/2013 | Luu |
| 2014/0040171 A1 | 2/2014 | Segalov et al. |
| 2014/0099610 A1 | 4/2014 | Bak et al. |
| 2014/0136185 A1 | 5/2014 | Bhatt |
| 2014/0143250 A1 | 5/2014 | Martin et al. |
| 2014/0337120 A1 * | 11/2014 | Ercanbrack ........ G06Q 30/0244 705/14.43 |

FOREIGN PATENT DOCUMENTS

| | | |
|---|---|---|
| KR | 20090068803 | 6/2009 |
| KR | 20090080822 | 7/2009 |

* cited by examiner

US 10,600,073 B2

SYSTEM AND METHOD FOR TRACKING THE PERFORMANCE OF ADVERTISEMENTS AND PREDICTING FUTURE BEHAVIOR OF THE ADVERTISEMENT

CROSS-REFERENCE TO RELATED APPLICATIONS

This application claims the benefit of U.S. Provisional Application 62/034,010 filed on Aug. 6, 2014. This application is also a continuation-in-part (CIP) of U.S. patent application Ser. No. 14/272,081, filed on May 7, 2014. The Ser. No. 14/272,081 application is a continuation application of U.S. patent application Ser. No. 13/482,473, filed on May 29, 2012, now U.S. Pat. No. 8,782,046. The Ser. No. 13/482,473 application is a continuation-in-part of U.S. patent application Ser. No. 13/279,673 filed on Oct. 24, 2011, now pending. The Ser. No. 13/279,673 application is a continuation-in-part of U.S. patent application Ser. No. 13/050,515, filed on Mar. 17, 2011, now U.S. Pat. No. 8,930,377, which claims the benefit of U.S. provisional application No. 61/316,844 filed on Mar. 24, 2010. The Ser. No. 13/050,515 application is also a continuation-in-part of U.S. patent application Ser. No. 13/214,588, filed on Aug. 22, 2011, now U.S. Pat. No. 8,965,835. The content of each of the above-referenced applications are herein incorporated by reference for all that they contain.

TECHNICAL FIELD

The disclosure generally relates to a system and method for managing an advertising campaign, and more specifically to a system and methods for monitoring the performance of advertisements over the web.

BACKGROUND

Today, advertising is all about demographics and does not address the true intent of the target audience. Advertisers are trying to target people based solely on, for example, their age and music preferences, rather than capturing the target audience's true intentions. Alternatively, advertisers try to target people based on limited intent information, such as search queries.

For example, in search advertising, i.e. advertising in search engines, when searching for "shoes" the age and/or the gender of the user submitting the search query does not directly affect the content of the advertisements displayed to the user. Advertisements for shoes are provided merely because searchers have the limited intent for shoes. However, this limited intent-based approach is limited in scope and inaccurate in targeting the required audiences.

An ability to understand the effectiveness of advertisements in real-time in people, and therefore predict the future behavior of the advertisement, may be of significant advantage to advertisers, presenters, politicians, chief executive officers (CEOs) and others who may have an interest in a deeper understanding of the performance of advertising and the target of an audience's true intent. Current solutions do not effectively address such issues.

It would therefore be advantageous to provide a solution for monitoring the performance of an advertisement and predicting the future behavior of the advertisement.

SUMMARY

A summary of several exemplary embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments include a method for tracking the performance of an advertisement. The method comprises: receiving at least one advertisement and associated metadata from a client node; publishing the at least one advertisement through at least one advertisement channel; continuously collecting at least one variable in association with the at least one advertisement; continuously monitoring the performance of the at least one advertisement; and generating a prediction of future behavior of the at least one advertisement with respective to the at least one variable and the monitored performance of the at least one advertisement.

Certain embodiments include a system for tracking the performance of an advertisement. The system comprises: a processing unit coupled to the network; and, a memory coupled to the processing unit that contains therein instructions that when executed by the processing unit configures the system to: receive at least one advertisement and associated metadata from a client node; publish the at least one advertisement through at least one advertisement channel; continuously collect at least one variable in association with the at least one advertisement; continuously monitor the performance of the at least one advertisement; and generate a prediction of future behavior of the at least one advertisement with respect to the at least one variable and the monitored performance of the at least one advertisement.

BRIEF DESCRIPTION OF THE DRAWINGS

The subject matter that is regarded as the disclosed embodiments is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
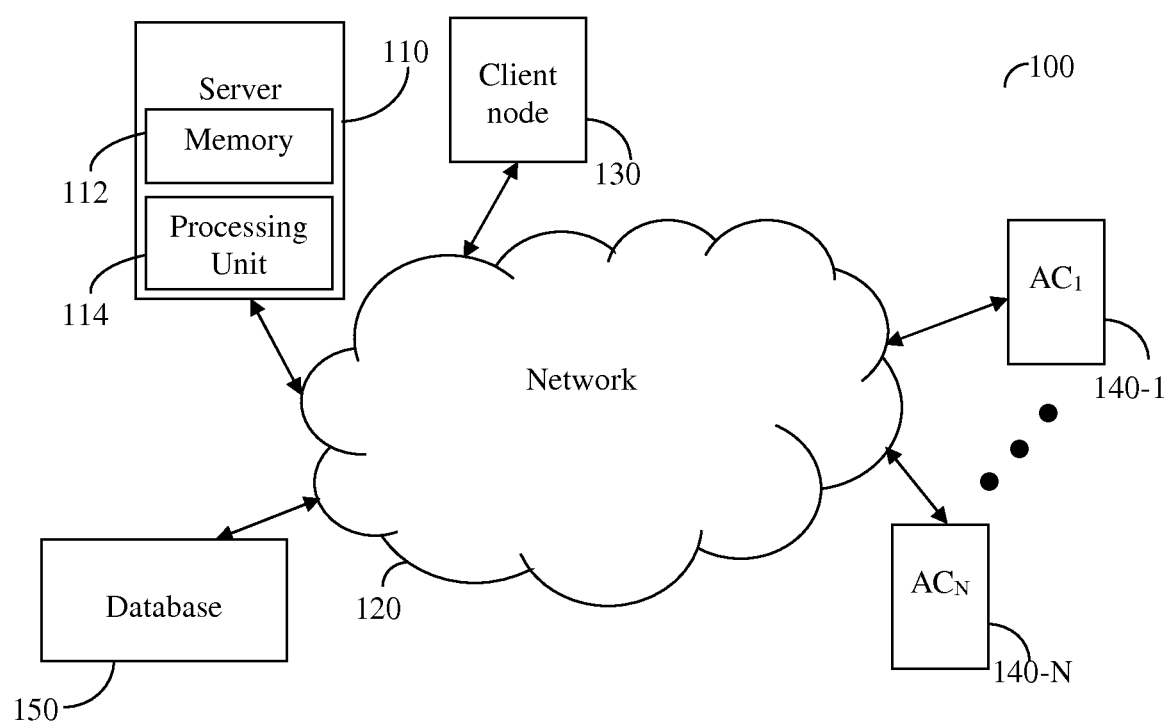
FIG. 1 is a schematic diagram of a networked system utilized to describe the various disclosed embodiments.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 depicts an exemplary and non-limiting schematic diagram of a networked system 100 in accordance with an embodiment. A server 110 is communicatively connected to a network 120. The network 120 can be wired or wireless, a local area network (LAN), a wide area network (WAN), a metro area network (MAN), the Internet, the worldwide web (WWW), the likes, any combinations thereof, and other networks capable of enabling communication between the elements of the system 100.

According to one embodiment, the server 110 is configured to receive at least one advertisement from a client node 130 over the network 120. The client node 130 may be, for example, a smart phone, a mobile phone, a laptop, a tablet computer, a personal computer (PC), a wearable computing device, and the like. The advertisement may be any type of advertising content, such as multimedia content, textual content, a combination thereof, and so on.

In an embodiment, the server 110 is configured to receive from the client node 130 metadata associated with the advertisement. The metadata may include a selection of one or more advertisement channels 140 to publish the advertisement, an amount of time for publishing the advertisement in each channel, a context of the advertisement, and so on. An advertisement channel 140 may be, for example, a television channel, a radio channel, a webpage, a social media platform, an application installed or accessed by a client node 130, and the like.

Based on the received information, and in particular the metadata, the server 110 is configured to publish the advertisement through the at least one advertisement channel 140-1 through 140-N communicatively connected to the network 120. The server 110 is configured to continuously collect one or more variables in association with the at least one advertisement. The variables may be related to the advertisement channels and/or the context of the advertisement channels 140. By monitoring the variables, changes in the context of the advertisement channel 140 can be identified.

In on non-limiting embodiment, the variables may include data or values related trends in association with the at least one advertisement. Trends may be any type of topic that is discussed in or related to one of the advertisement channels 140 above a predetermined threshold. A trend is usually determined based on an association between certain terms (taxonomies) and/or the volume of their appearances in one or a combination of multiple advertisement channels 140. Further discussion the trend variables is provided below.

The server 110 is configured to continuously monitor the performance of the at least one advertisement. The performance may be based, for example, on engagement of users with the advertisement. The engagement may be determined based on, for example, the amount of clicks on the advertisement, the amount of time users spent viewing the advertisement, and so on.

Respective of the performance of the advertisement and the variables (such as the trend variables), the server 110 is configured to generate a prediction of a future behavior of the at least one advertisement in real-time. For example, if a variable indicates a decreasing trend in the exposure and/or engagement of the advertisement, then a prediction would be that the advertisement will poorly perform in the future.

In another embodiment, the variables can define the sentiment of a trend and/or term taxonomies usage and the prediction of the future performance is determined based on these variables. For example, if a certain brand name is increasingly associated with negative sentiment phrases, then an advertisement to a product by that brand will poorly perform in the future. Techniques for predicting future trends of term taxonomies usage are discussed in U.S. Pat. No. 8,782,046, assigned to the common assignee, the contents of which are hereby incorporated by reference.

The prediction can then be used by the client node 130 for identifying alternative, more appropriate advertisement channels to publish the advertisement therefrom. According to another embodiment, the prediction may be used by the server 110 in order to automatically enhance the effectiveness of the advertisement respective of the prediction. Data related to the performance as well as to the future performance of the at least one advertisement is stored in a database 150 communicatively connected to the network 120.

In certain configurations, the server 110 comprises a processing unit 112 which is coupled to an internal memory 114. The processing unit 112 may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In an embodiment, the memory 114 contains instructions that when executed by the processing unit 112 results in the performance of the methods and processes described herein below. Specifically, the processing unit 112 may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing unit 112 to perform the various functions described herein.

Figure 2:
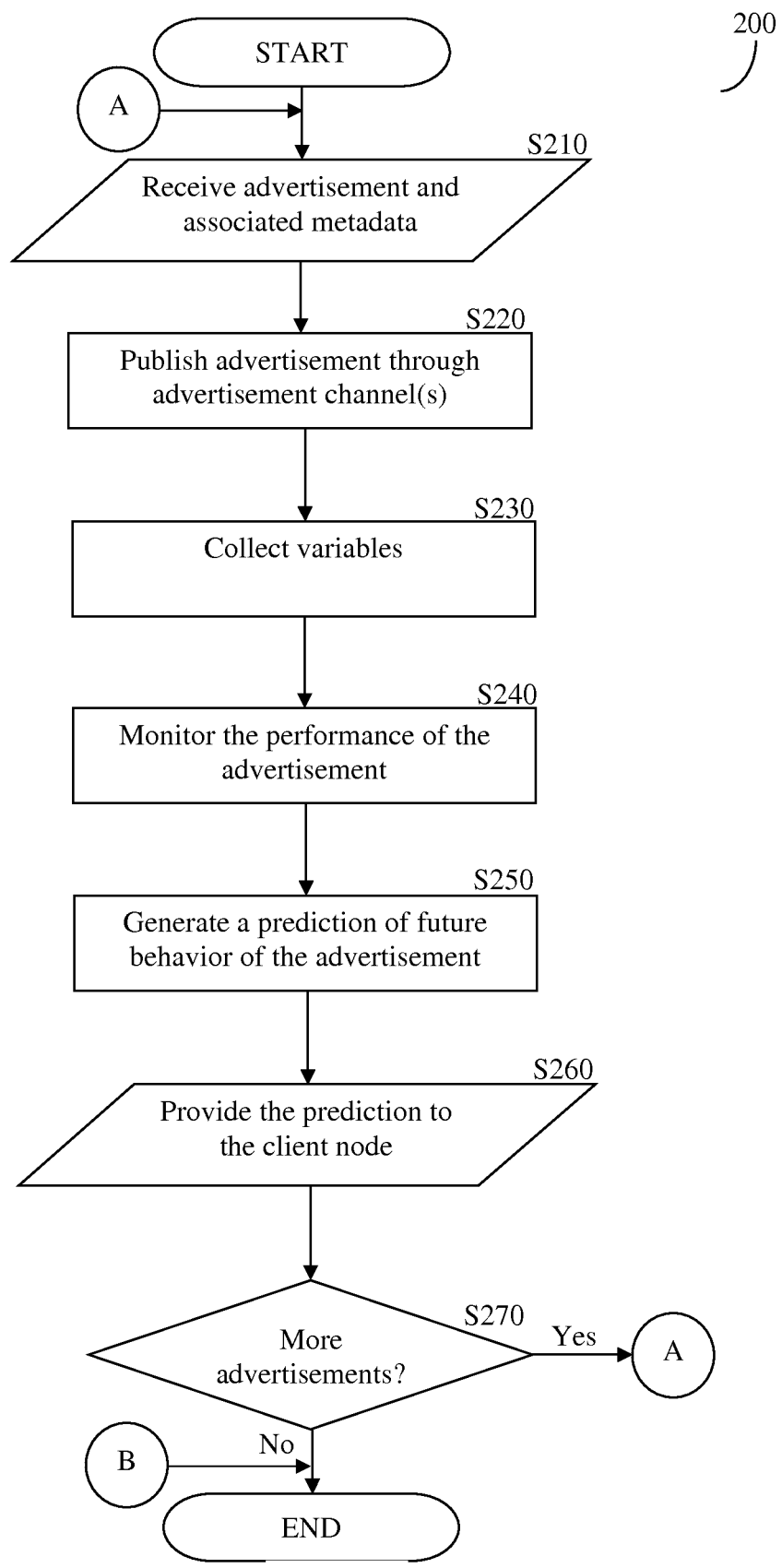
FIG. 2 is a schematic diagram of a method for tracking the performance of an advertisement in accordance with an embodiment.

FIG. 2 depicts an exemplary and non-limiting flowchart 200 describing a method for tracking the performance of an advertisement in accordance with one embodiment. The method may be performed by the server 110. Without limiting the scope of the disclosed embodiment, the method will be discussed with reference to the various elements shown in FIG. 1.

In S210, at least one advertisement and associated metadata from the client node 130 is received. The advertisement may be any type of advertising content, such as multimedia content, textual content, a combination thereof, and so on. The metadata may include a selection of one or more sources to publish the advertisement, an amount of time for publishing the advertisement in the source(s), a context of the advertisement, and so on.

In S220, the advertisement is published through at least one advertisement channel 140-1 in, for example, an electronic commerce (e-commerce) web-page. In S230, one or more variables in association with the advertisement are continuously collected. The variables may be related to the context of the advertisement channel 140-1 and thereby identify changes in the context of the advertisement channel 140-1. In a non-limiting embodiment, the collection of the variables may include extraction of data from the database 150 of any one of the advertisement channels 140.

In a non-limiting embodiment, the variables may include data or information related to trends in association with the at least one advertisement. Trends may be any type of topic that is discussed in the advertisement channel 140-1 (or any channel that the advertisement is published on) above a predetermined threshold. A trend is usually determined based on an association between certain terms (or taxonomies) and/or the volume of their appearances in one or more advertisement channels 140. It should be noted that the terms may be explicitly or implicitly related to the advertised content. For example, the term "hot" may be implicitly related to an advisement of an ice cream. As another example, the term "Coca Cola®" may explicitly related to any product sold by the brand. The variable can further define a sentiment for a term and/or a trend. The sentiment may be negative, positive, or natural. Examples for analyzing sentiment trends based on term taxonomies are further described in U.S. Pat. No. 8,965,835 assigned to the common assignee and the contents of which are hereby incorporated by reference.

In S240, the performance of the advertisement through the advertisement channel 140-1 is monitored. The performance may be based, for example, on engagement of users with the advertisement. The engagement may be determined based on, for example, the amount of clicks on the advertisement, the amount of time users spent viewing the advertisement, click through and conversion rates, and so on.

In S250, a prediction of the future behavior of the advertisement is generated respective of the current performance and the determined variables of the advertisement in the advertisement channel 140-1 and the one or more associated variables.

In optional S260, the prediction is provided to the client node 130. The prediction can then be used by the client node 130 for identifying alternative, more appropriate advertisement channels to publish the advertisement therefrom. According to another embodiment, the prediction may be used by the server 110 in order to automatically enhance the effectiveness of the advertisement respective of the prediction. According to yet another embodiment, the prediction is sent for storage in the database 150 for future use.

In S270 it is checked whether there are more advertisements and if so, execution continues with S210; otherwise, execution terminates.

As a non-limiting example, an advertisement for coats is received by the server 110 and published in an Italian news website over the network 120. The current weather in Italy identified as warm and the performance of the advertisement is average. Upon identification that in the news website there are many mentions that winter is arriving to Italy, the server 110 predicts automatically that the performance of the advertisement will improve. Respective thereto, the server 110 may automatically increase the appearances of said advertisement in additional advertisement channels.

The various embodiments of the disclosure are implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for tracking the performance of an advertisement, comprising:

receiving at least one advertisement and associated publishing instructions from a client node, wherein said receiving comprises receiving from the client node the at least one advertisement and receiving from the client node the associated publishing instructions, wherein the publishing instructions comprise instructions for publishing the at least one advertisement;

publishing the at least one advertisement through at least one advertisement channel according to the publishing instructions, wherein the at least one advertisement channel comprises a television channel, wherein said publishing comprises publishing the at least one advertisement through the television channel according to the publishing instructions that were received from the client node;

continuously collecting at least one variable in association with the at least one advertisement, wherein the at least one variable is related to a context of the television channel, wherein the at least one variable is not related to an action performed by a user, wherein the at least one variable is related to a trend in association with the at least one advertisement, and wherein the trend is determined based on at least a first term and a second term that are related to the at least one advertisement, wherein the trend is determined based on association between the at least first and second terms and a volume of appearances of the at least first and second terms in the television channel;

identifying, based on said continuously collecting, changes in the context of the television channel;

continuously monitoring the performance of the at least one advertisement; and generating a prediction of future behavior of the at least one advertisement with respect to the changes in the context of the television channel and the monitored performance of the at least one advertisement.

2. A non-transitory computer readable medium having stored thereon instructions for causing a processing circuitry to execute a process for tracking the performance of an advertisement, the process comprising:

receiving at least one advertisement and associated publishing instructions from a client node, wherein said receiving comprises receiving from the client node the at least one advertisement and receiving from the client node the associated publishing instructions, wherein the publishing instructions comprise instructions for publishing the at least one advertisement;

publishing the at least one advertisement through at least one advertisement channel according to the publishing instructions, wherein the at least one advertisement channel comprises a television channel, wherein said publishing comprises publishing the at least one advertisement through the television channel according to the publishing instructions that were received from the client node;

continuously collecting at least one variable in association with the at least one advertisement, wherein the at least one variable is related to a context of the television channel, wherein the at least one variable is not related to an action performed by a user, wherein the at least one variable is related to a trend in association with the at least one advertisement, and wherein the trend is determined based on at least a first term and a second term that are related to the at least one advertisement, wherein the trend is determined based on association between the at least first and second terms and a volume of appearances of the at least first and second terms in the television channel;

identifying, based on said continuously collecting, changes in the context of the television channel;

continuously monitoring the performance of the at least one advertisement; and generating a prediction of future behavior of the at least one advertisement with respect to the changes in the context of the television channel and the monitored performance of the at least one advertisement.

3. A system for tracking the performance of an advertisement comprising:

a processing circuitry coupled to the network; and, a memory coupled to the circuitry, the memory containing therein instructions that when executed by the processing circuitry, configure the system to:

receive at least one advertisement and associated publishing instructions from a client node, wherein said receive comprises receiving from the client node the at least one advertisement and receiving from the client node the associated publishing instructions, wherein the publishing instructions comprise instructions for publishing the at least one advertisement;

publish the at least one advertisement through at least one advertisement channel according to the publishing instructions, wherein the at least one advertisement channel comprises a television channel, wherein said publish comprises publishing the at least one advertisement through the television channel according to the publishing instructions that were received from the client node;

continuously collect at least one variable in association with the at least one advertisement, wherein the at least one variable is related to a context of the television channel, wherein the at least one variable is not related to an action performed by a user, wherein the at least one variable is related to a trend in association with the at least one advertisement, wherein the trend is determined based on association between at least a first term and a second term that are related to the at least one advertisement, wherein the trend is determined based on association between the at least first and second terms and a volume of appearances of the at least first and second terms in the at least one advertisement channel;

identify, based on said continuously collecting, changes in the context of the television channel;

continuously monitor the performance of the at least one advertisement; and generate a prediction of future behavior of the at least one advertisement with respect to the changes in the context of the television channel and the monitored performance of the at least one advertisement.

4. The method of claim 1, wherein the at least one advertisement channel further comprises at least one of: a radio channel, a webpage, a social media platform, an application installed or accessed by the client node.

5. The method of claim 1, wherein the publishing instructions comprise at least one of: a selection of at least one advertisement channel to publish the at least one advertisement, an amount of time for publishing the at least one advertisement in the at least one advertisement channel, and a context of the at least one advertisement.

6. The method of claim 1, wherein the volume of appearances of the at least two terms in the at least one advertisement channel is above a predetermined threshold.

7. The method of claim 1, wherein the trend is determined based on a volume of appearances of a taxonomy in advertisements published through the at least one advertisement channel.

8. The method of claim 1, wherein the performance is based on engagement of users with the at least one advertisement, wherein the engagement is determined based on at least one of: an amount of clicks on the advertisement, a number of time users spent viewing the advertisement.

9. The method of claim 1, the method further comprising at least one: identifying alternative and more appropriate advertisement channels to publish the advertisement therefrom; and enhancing the effectiveness of the advertisement respective of the prediction.

10. The method of claim 1, wherein the at least one variable defines a sentiment of the trend, wherein the sentiment is analyzed based on taxonomies of the first and the second terms.

11. The system of claim 3, wherein the at least one advertisement channel is at least one of: a radio channel, a webpage, a social media platform, an application installed or accessed by the client node.

12. The system of claim 3, wherein the publishing instructions comprise at least one of: a selection of at least one advertisement channel to publish the at least one advertisement, an amount of time for publishing the at least one advertisement in the at least one advertisement channel, and a context of the at least one advertisement.

13. The system of claim 3, wherein the volume of appearances of the at least two terms in the at least one advertisement channel is above a predetermined threshold.

14. The system of claim 3, wherein the trend is determined based on a volume of appearances of a taxonomy in advertisements published through the at least one advertisement channel.

15. The system of claim 3, wherein the performance is based on engagement of users with the at least one advertisement, wherein the engagement is determined based on at least one of: a number of clicks on the advertisement, an amount of time users spent viewing the advertisement.

16. The system of claim 3, wherein the system is further configured to perform at least one of: identify alternative and appropriate advertisement channels to publish the advertisement therefrom; and enhance the effectiveness of the advertisement respective of the prediction.

\* \* \* \* \*